United States Patent [19]
Ciliberti, Jr.

[11] 3,986,894
[45] Oct. 19, 1976

[54] ELECTRIC BATTERY WITH MULTI-CELL STACK ISOLATION

[75] Inventor: Frank Leonard Ciliberti, Jr., Ossining, N.Y.

[73] Assignee: P. R. Mallory & Co., Inc., Indianapolis, Ind.

[22] Filed: Apr. 29, 1974

[21] Appl. No.: 465,204

Related U.S. Application Data

[63] Continuation-in-part of Ser. No. 168,582, Aug. 3, 1971, abandoned.

[52] U.S. Cl. .............................. 429/153; 264/272; 429/185
[51] Int. Cl.² .................................... H01M 2/00
[58] Field of Search ............ 136/87, 131, 133, 175, 136/171

[56] References Cited
UNITED STATES PATENTS

| | | | |
|---|---|---|---|
| 690,770 | 1/1902 | Reed et al. | 136/87 |
| 2,389,674 | 11/1945 | McFarland | 136/175 |
| 2,894,053 | 7/1959 | Louzos | 136/87 |
| 3,251,015 | 5/1966 | Denham | 264/272 |
| 3,364,567 | 1/1968 | Brown et al. | 264/272 |

Primary Examiner—John H. Mack
Assistant Examiner—H. A. Feeley
Attorney, Agent, or Firm—Ronald S. Cornell; Israel Nissenbaum; Charles W. Hoffmann

[57] ABSTRACT

A construction which minimizes damage to alkaline electrolyte batteries due to electrolyte leakage caused by extreme variations in temperature is disclosed. The batteries comprise a multiplicity of individually sealed cells, arranged in electrically connected stacks, each stack being disposed in a moisture-proof plastic container and/or cup filled with an encapsulating resin in the entire space within the cup, with the encapsulated assembly being housed in a metal outer container. The cells within each stack and each stack itself is thus isolated, thereby minimizing any damage that might result from inter-cell leakage, from interstack leakage, and from leakage that would corrosively affect associated equipment in an assembled apparatus, due to extreme temperature variations, especially under high humidity conditions.

13 Claims, 5 Drawing Figures

ELECTRIC BATTERY WITH MULTI-CELL STACK ISOLATION

This application is a continuation-in-part of U.S. Ser. No. 168,582, filed Aug. 3, 1971 now abandoned.

THE INVENTION

This invention relates to a multi-cell alkaline electrolyte battery construction which protects the battery from damage caused by exposure to extreme temperature variations.

BACKGROUND OF THE INVENTION

There are many applications where multi-cell batteries with alkali electrolytes are used and where the ambient conditions involve temperature changes and thermal shock exposures between wide extremes of low temperature and of elevated temperature with a high humidity condition. Under such conditions, it has been found necessary to house such batteries in metallic outer containers, since at low temperatures plastics may become quite brittle and can be easily cracked if subjected to any sort of physical shock.

The metal comprising the outer container must possess certain properties, though. It should be non-magnetic, non-corrosive, light in weight but of high strength. While certain forms of steel or plated steel may be used for the housing, it has been found that steel and even plated steel can corrode and rust under thermal shock conditions, thereby leading to chips, cracks and pits in the container. Aluminum, however, was found to possess all the necessary properties to enable the housing to withstand thermal shock conditions, and thus is the preferred housing material herein.

When alkaline electrolyte batteries are exposed to thermal shocks, large quantities of electrolyte may be released during a venting operation. As a result, discharge of liquid electrolyte from interstack cells will occur, leading to external battery leakage.

Although protective encapsulating materials such as epoxy are used to cover the cells and to enclose them, such protection is insufficient to prevent leakage under extreme temperature variations. At elevated temperatures, the encapsulating material seems to become sufficiently porous to accept and permit seepage of the electrolyte and of surface moisture which remains when the ambient temperature declines. As the temperature continues to drop, the moisture and seepage filaments may be converted to the frozen phase, so that even minute quantities of moisture or seepage can create internal fracture conditions due to expansion upon freezing.

Further, under extreme temperature variations, the individual cell components, such as the seal and the container, will expand and contract to a greater degree than the surrounding encapsulating material. The net result will be spaces adjacent the external cell container which will receive any released liquid electrolyte, which electrolyte will then find its way to the enlarged fissures and internal crevices formed in the protective enclosing material.

Sealing of individual electric cells has been developed to a very high degree of effectiveness. Nevertheless, because of slight variations that may occur during the manufacturing processes, some conditions do occasionally occur that also permit leakage from an apparently well-sealed cell. Such leakage permits the electrolyte to exude from the cell and such electrolyte also may find its way to the enlarged fissures and internal crevices formed in any protective enclosing material.

When a cell or stack of cells is enclosed in an aluminum outer case, the alkali electrolyte attacks such an aluminum housing and detrimentally affects the battery. Even worse, if the electrolyte manages to eat away at the housing and to pass beyond the housing, the alkali may attack the components of the circuitry, with which a battery is assembled, as in electronic equipment.

The object of this invention is to provide a simple construction for a battery stack, for a small battery, and for an assemblage of several battery stacks in a larger battery, which will serve to isolate the cells of the stack in such manner as to prevent the exudation of cell electrolyte from establishing short circuits by intercell bridging, or by interstack bridging, or from exiting from the batteries and corroding associated electronic equipment.

Another object of the invention is to provide an assembly combination in which a simple and inexpensive moisture-proof cup is utilized as a container for a stack of electric cells together with a body of enclosing epoxy resin which are assembled in such manner as to enable the plastic cup to serve as a moisture barrier and enclosing shield.

Another object of this invention is to provide a novel assembly construction for the elements of the battery, which will prevent or at least suppress the harmful effects from the moisture in a highly humid atmosphere to which the batteries may be subjected with their associated equipment for relatively long periods of time.

Another object of the invention is to provide a combination assembly in which a plastic cup is utilized as a primary container and confining structure for a stack of superposed electric cells and a body of epoxy resin. The resin serves to engage and enclose the cells and to fill all the space surrounding and in between the cells of the stack, defined within a predetermined volume of space, so the epoxy resin upon changing from its poured fluid state to its solid state will provide a totally enclosing structure around the cells of the stack while individually isolating the cells. In the aggregate, the resin provides a solid encapsulating enclosure for the stack, which in turn is essentially moisture sealed by the plastic cup to prevent exiting of any electrolyte outwardly from the stack space to adjacent electronic equipment, and to prevent the entrance of ambient moisture to the encapsulating material while such material is being subjected to cycles of temperature change.

Another object of this invention is to provide an effective heat seal and moisture barrier around each encapsulating mass surrounding each stack.

The construction of cell stacks for electric batteries and the manner in which they are assembled and manufactured, are described in the following specification, taken in connection with the associated drawings, in which:

FIG. 1 shows a vertical section of a plastic cup, as utilized in this invention, into which a predetermined amount of thermosetting epoxy resin is preliminarily introduced in its liquid state at elevated temperature;

FIG. 2 shows an assembly of several cells interconnected and disposed in stacked arrangement, after which they are inserted into the cup of FIG. 1, and pressed downward to force the encapsulating epoxy while still in liquid state to rise and express all air from the empty space within the cup and to fill such space to form a completely enclosing structure of the epoxy with all air excluded therefrom and with intercell layers formed to isolate the individual cells;

Figure 5:
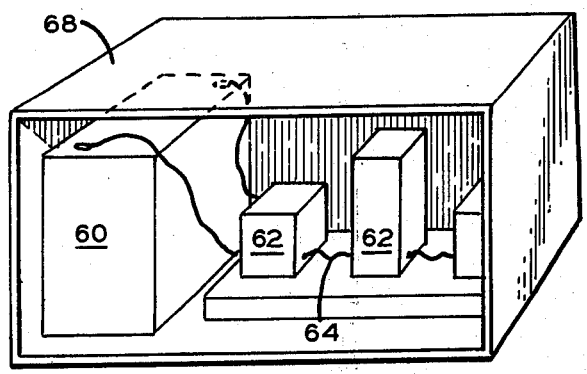

and FIG. 5 is a schematic view of an electronic apparatus assembly associated with a battery of this invention.

As generally indicated in the drawings, a shielding member cup 12 of plastic is first filled to a low level with a predetermined quantity of epoxy in liquid form, and then a stack of assembled cells is pressed down into the epoxy, while it is still liquid and readily flowable, to force the liquid epoxy upward into all of the space not otherwise occupied by the stack of cells. The epoxy thus drives out all the air from the unoccupied space to form an epoxy enclosure around the stack and around and between the individual cells, thereby to fill all of the space between the cells and between the stack of cells and the cup, after which the epoxy is permitted to solidify, within a short period of time controlled by the hardening catalyst utilized for this application to control the curing time of the epoxy.

Figure 1:
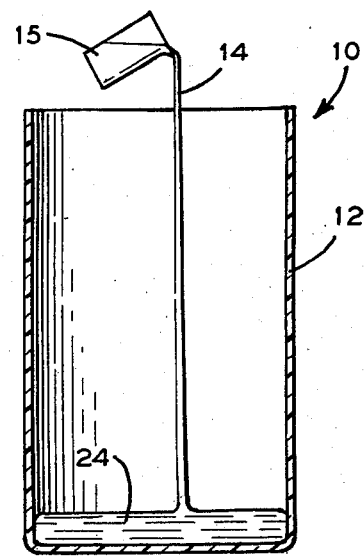

As shown in FIG. 1, the invention 10 utilizes a cup 12 into which a predetermined quantity 14 of epoxy in liquid form is delivered through a suitable controlled apparatus which is here shown in simple schematic form as a receptacle 15 from which the epoxy 14 is permitted to flow into the cup 12.

Cup 12 is preferably seamless. While it could be formed from two individual pieces and sealed together, such a structure would be weak at the seam, thereby permitting electrolyte leakage. Thus, a seamless cup is preferred, with the cup being vacuum formed. Suitable plastics for the cup are the vinyl plastics, such as polyvinyl chloride, and polypropylene. These plastics are of the semi-rigid type and thus will expand and contract to a certain degree.

The epoxy encapsulating material 14 should also be one of the semi-rigid type, with a coefficient of expansion similar to that of the plastic cup, thereby permitting the epoxy to expand and contract to a certain degree, within the strict confines of the cup. A preferred encapsulating material is Norcast 7633, which uses catalyst 133, and is manufactured by Northern Labs, R. H. Carlson Company, in the ratio of 100 parts resin to 38 parts catalyst. While the epoxy is still relatively soft and fluid, a stack 16 of assembled cells 18, which are individually sealed, is pressed down into the cup 12 and into the fluid epoxy 14 to force the epoxy upward into the empty space 20 around the stack, and between the stack and the cup 12, and into the spaces between the superposed cells 18. The original quantity 14 of the epoxy is selected to be sufficient to fill all of the empty space in the cup and between the cells when the stack is pressed downward into the cup, while leaving a small amount of the original quantity 24 to serve as an insulating base or floor for the stack of cells, with the top of the expressed epoxy reaching a level sufficient to just about cover the top cell 18-1 of the stack.

Figure 2:
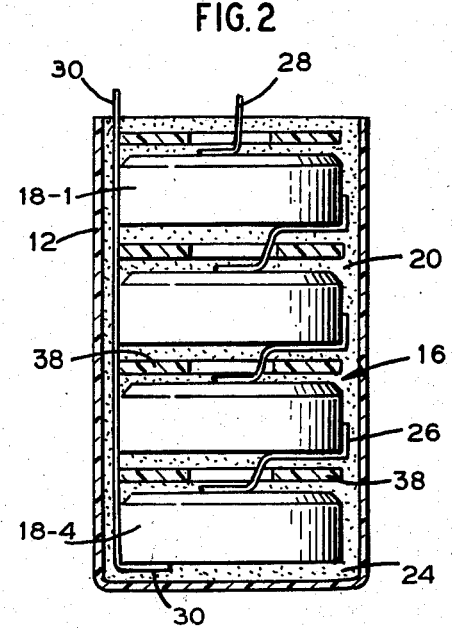

As shown in FIG. 2, the stack shows four cells 18-1 through 18-4, with intercell connecting strips 26 between each superposed pair of cells 18. A top electrode strap 28 is connected to the center terminal of top cell 18-1 and a second terminal strip 30 is connected to the outer terminal of the bottom cell 18-4. The two terminal straps 28 and 30 serve for connection, after the hardening of the epoxy, to two terminals 32 and 34 on a top terminal plate 36, which is shown assembled in FIG. 3, and disposed on top of the stack.

In the step of assembling the cells 18-1 to 18-4 in the stack, a suitable insulating disc of absorbent Kraft paper 38 is appropriately positioned to prevent the intercell connecting straps 26 connected to a central terminal of any cell from engaging its own external metal container which is of the opposite polarity, since such an engagement would be a short circuit of the cell.

When the epoxy surrounding the stack of cells has solidified, an absorbent insulating disc 38 is threaded down over the center terminal strap 28 to permit that strap 28 to be suitably connected and welded to the central terminal 32 on the terminal plate 36. The outer terminal strap 30 extends upward beyond the outer peripheral edge of the insulating disc 38 and is there joined to the terminal 34 of the top cover terminal plate 36.

Figure 3:
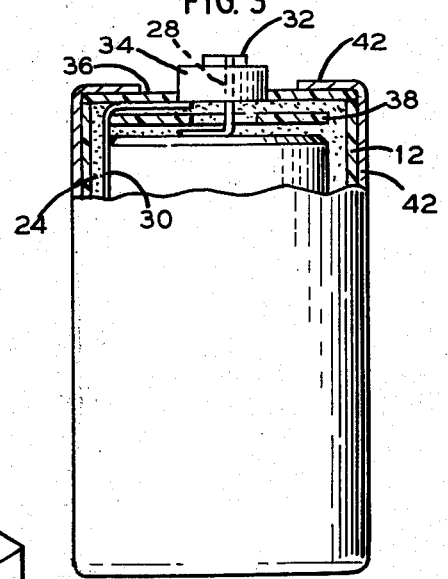
FIG. 3 is a vertical elevational view showing the cup of FIG. 2 in a metal enclosing housing.

The two connections from the cell terminal straps 28 and 30 are made to the terminals 32 and 34 on the top plate with sufficient length in the straps 28 and 30 to permit an additional quantity of epoxy to be disposed on the top layer in the cup 12, to cover the upper insulating disc 38, so the terminal plate 36 when assembled as shown in FIG. 3 will rest on the top of the added layer of epoxy, which then hardens as a complete layer over the top surface of the top cell 18-1 and in the annular space and area of the epoxy cylinder formed around the cells in the space between the cells and the cup.

After the epoxy has solidified so the terminal plate 36 rests on a hard layer of epoxy, the entire cup assembly, with the stack of cells and the epoxy enclosure within the cup, is axially inserted into a cylindrical metal housing 42, such as aluminum, and the top open edge of the cylindrical housing 42 is then peened over as shown at the top of FIG. 3, to tightly press the terminal plate 36 in place against casual displacement, and to complete the closure of the battery cells. Terminal plate 36 preferably consists of an ABS resin, which is a family of co-polymers of acrylonitrile, butadiene and styrene. This material is preferred since it has a sufficient degree of resiliency to expand along with the protective encapsulating material, but will still maintain a strong closure for the multi-cell battery.

Figure 4:
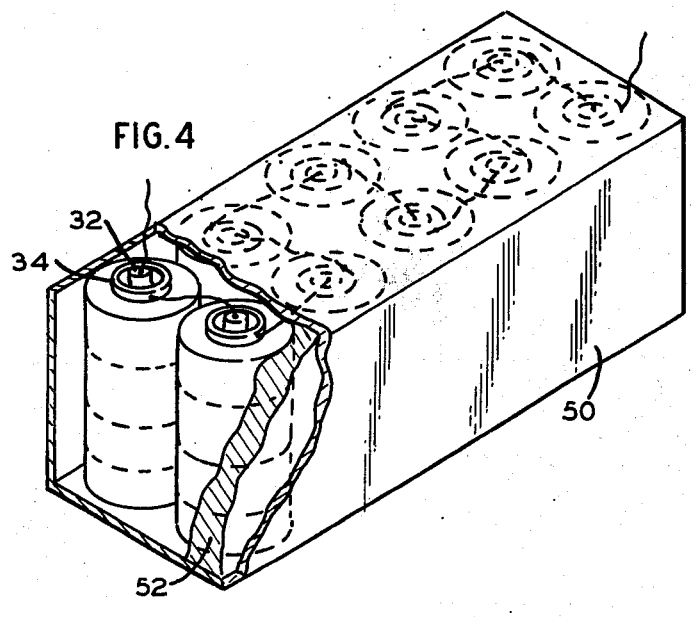
FIG. 4 is a schematic perspective view of a multistack battery.

In FIG. 4 is shown a larger battery, in which several smaller individually isolated battery stacks, such as in FIG. 3, are assembled into a larger battery with ten stacks being shown, consisting of ten assemblies of the type shown in FIG. 3. In the battery shown in FIG. 4, appropriate connections are made, between the respective battery stacks and for connection to appropriate terminals to provide external terminals for the total voltage of the entire battery and for such sub voltages as may be desired. After all of the interstack connections are made in the battery of FIG. 4, of which just two connections are indicated, the space in the container 50 is then filled with an epoxy 52 to hold the stacked batteries in place and to insulate them additionally from each other.

Experimental tests conducted with the cell stacks, with and without the provisions of the enclosing cup, have shown remarkable improvements due to the cup, against leakage and breakdowns that would otherwise be attributable to moisture in the atmosphere. In the case of a battery stack merely enclosed in the epoxy without a cup, a battery stack was able to tolerate subjection to cyclic thermal changes from minus 60° to plus 175° Fahrenheit for a period of only 14 days, whereas when the same cell stack was protected by a cup as well as the epoxy with the construction shown in FIG. 3, that battery was able to withstand leakage for a period in excess of 28 days.

Similarly in the case of cyclic tests of a battery of the type and construction shown in FIG. 4, the battery exhibited leakage after only 24 hours without the cup, but showed no evidence of leakage with the cup construction, even after subjection to the cyclic temperature changes from minus 60° to plus 175° over a test period of more than six months.

The benefits derived from the battery herein are especially apparent from the view in FIG. 5, in which a battery 60 of this invention, in single stack or in multiple stacks, is assembled with some electronic components 62, and some exposed wiring 64 between the components, all housed in an enclosure 68.

In present conventional assemblies, indicated generally in FIG. 5, leakage in and from a main battery may harm not only the battery, but may also harm the associated components 62 and exposed wiring 64. The advantages of a sealed and protected battery, as herein disclosed, are that not only is the battery protected, but also the associated equipment is protected as well.

This protection is believed to result from a novel type of cooperation between the plastic cup and the encapsulating resin. Since both the cup and the epoxy are semi-rigid, both will "breathe," as the individual cell components expand and contract as a result of cyclic temperature change. The epoxy, by being permitted to expand only within the confines of the protective cup, will not be able to expand to the point of creating fissures or crevices.

Moreover, the cup 12 acts as a temperature barrier between the encapsulating epoxy and the outer metal battery container. Because of the different coefficients of expansion of the metal container and the epoxy, if these two materials were in direct contact, upon extreme temperature variations, the outer surface of the epoxy would crack. The cup, however, being present at the interface of the epoxy and the metal housing prevents such harmful effects. By this means, therefore, any electrolyte which may have worked through the epoxy is prevented from attacking and corroding the metal battery container and other components in the device powered by the battery.

Generally speaking, then, this invention is directed to a battery construction which allows alkaline electrolyte batteries to withstand the rigors of repetitive thermal cycling, especially under conditions of high humidity. Recognizing that the operability and efficiency of a battery under such climatic conditions depends upon preventing electrolyte exudation from reaching other cells within the stack, or other stacks of cells, or the associated electronic equipment powered by such batteries, the present invention is directed to a construction which greatly minimizes damage that might result from electrolyte leakage, thereby enhancing the overall operability of the battery.

The battery comprises a stack of superposed, individually sealed alkaline electrolyte cells, electrically interconnected. The stack of cells is disposed in an oversize plastic insulating cup, which is slightly larger diametrically than the stack of cells, to thereby define a free space around the stack to receive and confine a fluid encapsulating material which fills the space within the cup to enclose each sealed cell of the stack and to isolate each cell from the others, except for the intercell connections. The encapsulated assembly is then housed in a metal outer container, preferably aluminum. By this construction, any cell electrolyte released during a cell venting operation or as a result of failure of a cell seal will be confined to the space adjacent the cell, or within a single stack, thereby protecting other cells, stacks of cells, or associated electronic equipment from the corrosive effects of the electrolyte. Moreover, the novel combination of the plastic insulating cup and the fluid encapsulating material disposed therewithin acts to prevent the formation of minute cracks or fissures within the hardened encapsulating material to thereby prevent electrolyte leakage from detrimentally affecting other cell stacks or associated electronic equipment in the circuit.

The invention is not necessarily limited to the specific arrangements as illustrated, since modifications may be made without departure from the spirit and scope of the invention as set forth in the claims.

What is claimed is:

1. A multi-cell battery comprising:
   a plurality of individually sealed, liquid electrolyte containing cells;
   intercell connections between said cells; end terminals on the end cells of said stack for connecting the stack of cells to an external circuit;
   an insulating moisture-proof preformed plastic container to encircle and contain said stack of cells, said container being slightly larger than said stack to define a free space around said stack for receiving and confining fluid encapsulating material introduced into said free space;
   an encapsulating material filling the free space within said container and around said stack to substantially enclose each sealed cell of the stack to physically isolate each sealed cell from said plastic container and from each other except for said electrical connections;
   a metal outer can open at its top end
   said container together with its multi-cell and encapsulating material contents and said metal can being separate elements with said container and its contents being positioned within said can; and
   an end closure means for said open end of said can.

2. A multi-cell battery, as in claim 1, wherein said plastic container is vacuum formed, consists of a vinyl plastic, and is impervious to moisture and seals the engaged area of the encapsulating material to prevent any effects due to absorption of moisture and exudation of cell electrolyte, in response to temperature cycles that might otherwise affect the encapsulating material.

3. A multi-cell battery, as in claim 2, wherein said container consists of polyvinyl chloride.

4. A multi-cell battery, as in claim 1, wherein said container consists of polypropylene.

5. A multi-cell battery, as in claim 1, wherein an insulator is disposed between the top cell of said stack and said end closure support.

6. A multi-cell battery, as in claim 1, wherein the encapsulating material comprises a thermo-setting epoxy resin.

7. A multi-cell battery, as in claim 1, in which said container at its bottom diameter is slightly larger than the stack cell diameter to tend to centralize the stack concentrically in the container, and the diameter of the container gradually increases to the top of the container to provide free space between the stack and the container for receiving a thermosetting epoxy in liquid heated condition.

8. A multi-cell battery, as in claim 1, wherein said end closure comprises a disc which supports the top end terminals of said stack and is disposed to fit slidingly into and to close the open end of the metal outer can.

9. A multi-cell battery, as in claim 8, wherein said end closure disc is formed from an ABS resin.

10. A multi-cell battery, as in claim 1, wherein said metal outer case is formed from aluminum.

11. A multi-cell battery comprising: a stack of superposed, individually sealed, alkaline electrolyte cells; intercell connections between said cells; end terminals on the end cells of said stack for connecting the stack of cells to an external circuit; an insulating washer disposed between each superposed cell to prevent short-circuiting of the lower cell of a superposed pair by the intercell connection between said superposed pair; an insulating disc disposed above the top cell of said stack; an insulating, moisture-proof, vacuum formed plastic container to encircle and contain said stack of cells, said container being slightly diametrically larger than said stack to define a free space around said stack for receiving and confining fluid encapsulating material introduced into said free space; an encapsulating material filling the free space within said container and around said stack to substantially enclose each sealed cell of the stack to physically isolate each sealed cell from the others except for said intercell connections; an aluminum outer can open at its top end separate from said container for originally receiving said container and its multi-cell and encapsulating material contents; and an end closure support for said end terminals fitting relatively snugly into the open end of said can, said open end of said can being peened over to lock said closure support in place.

12. A multi-cell battery, as in claim 1, wherein an insulating washer is disposed between each cell to prevent short-circuiting between cells.

13. A multi-cell battery, as in claim 1, wherein said plastic container and said encapsulating material have similar coefficients of expansion thereby permitting said encapsulating material to expand and contract within the confines of said container.

* * * * *